US006975370B2

(12) United States Patent
Yu et al.

(10) Patent No.: US 6,975,370 B2
(45) Date of Patent: Dec. 13, 2005

(54) BACKLIGHT SYSTEM AND LIQUID CRYSTAL DISPLAY USING THE SAME

(75) Inventors: Tai-Cheng Yu, Tu-Chen (TW); Charles Leu, Fremont, CA (US); Kun-Jung Tsai, Tu-Chen (TW); Ga-Lane Chen, Fremont, CA (US)

(73) Assignee: Hon Hai Precision Ind. Co., LTD, Taipei Hsien (TW)

( * ) Notice: Subject to any disclaimer, the term of this patent is extended or adjusted under 35 U.S.C. 154(b) by 22 days.

(21) Appl. No.: 10/636,845

(22) Filed: Aug. 6, 2003

(65) Prior Publication Data

US 2004/0114068 A1 Jun. 17, 2004

(30) Foreign Application Priority Data

Dec. 13, 2002 (TW) ............................. 91220213 U

(51) Int. Cl.$^7$ .......................................... G02F 1/1335
(52) U.S. Cl. ....................................... 349/65; 349/68
(58) Field of Search ................................ 349/65, 68

(56) References Cited

U.S. PATENT DOCUMENTS

| 4,673,254 A | * | 6/1987 | Kato et al. ................... 359/599 |
| 5,528,709 A | * | 6/1996 | Koike et al. .................. 385/14 |
| 6,661,479 B2 | * | 12/2003 | Taniguchi et al. ............. 349/65 |

FOREIGN PATENT DOCUMENTS

TW 354654 3/1999

\* cited by examiner

*Primary Examiner*—Robert H. Kim
*Assistant Examiner*—Phu Vu
(74) *Attorney, Agent, or Firm*—Wei Te Chung

(57) ABSTRACT

A backlight system (100) in accordance with the present invention includes a plurality of light sources (110) for emitting light beams and a light guide plate (120) for receiving the light beams emitted by the light sources. The light guide plate includes a light input surface (121) and a light output surface (122) joining the light input surface. The light input surface has a plurality of recesses (124) therein. The recesses have cylindrical surfaces, each having a specific curvature, and the light beams emitted by the light sources pass through the cylindrical surfaces orthogonally. Since nearly all of the light beams enter into the light guide plate with few being reflected at the light input surface, the backlight system is highly efficient in light utilization.

4 Claims, 4 Drawing Sheets

BACKLIGHT SYSTEM AND LIQUID CRYSTAL DISPLAY USING THE SAME

BACKGROUND OF THE INVENTION

1. Field of the Invention

The present invention relates to a backlight device and particularly to an edge light type backlight device for use in a liquid crystal display (LCD) or the like.

2. Description of Related Art

An LCD device comprises, for example, a liquid crystal display panel and a backlight system mounted under the liquid crystal display panel for supplying light beams thereto. The backlight system mainly comprises a light source and a light guide plate, wherein the light guide plate is made of a transparent acrylic plastic, and is used for guiding the light beams emitted by the light source to uniformly illuminate the liquid crystal display panel.

The light source emits light beams into the light guide plate, wherein the light beams are totally internally reflected. In order to diffuse the light beams and emit them uniformly from a top surface of the light guide plate, protrusions or recesses are located on a bottom surface of the light guide plate, or a pattern of light diffusion dots are formed on the bottom surface of the light guide plate.

Referring to FIG. 7, a conventional backlight system 9 comprises a light source 40, which can be a light emitting diode, a miniature bulb, or another kind of point light source, a cage 30 having a reflective coating (not shown) thereon, a light guide plate 10, and a translucent sheet 20. The cage 30 has a locating notch 31 therein. The light guide plate 10 comprises a light input surface 11 and a light output surface 12.

In assembly, the light source 40 is arranged in the locating notch 31 of the cage 30, and the light guide plate 10 is accommodated in the cage 30. The light input surface 11 of the light guide plate 10 is adjacent to the light source 40. The translucent sheet 20 is placed upon the light guide plate 10.

In operation, light beams emitted by the light source 40 pass through the light input surface 11 and enter the light guide plate 10, and then are transmitted out from the light output surface 12 of the light guide plate 10. After that, the light beams pass through the translucent sheet 20 to illuminate an LCD panel.

However, the light source 40 has a certain emitting angle. For example, a light emitting diode used as the light source 40 emits light beams with an emitting angle in a range of 30° to 130°. Since the light input surface 11 is planar, when the light beams emitted by the light source 40 impinge on the light input surface 11, they are partly reflected, and partly transmitted. Not all the light beams enter the light guide plate 10. Thus the efficient utilization of the light beams is decreased, and the brightness of the light guide plate 10 is also decreased.

It is desirable to provide an improved backlight system for a liquid crystal display, which overcomes the above problems.

SUMMARY OF THE INVENTION

An object of the present invention is to provide a backlight system with highly efficient utilization of the generated light beams.

Another object of the present invention is to provide a backlight system with high brightness.

A backlight system in accordance with the present invention comprises a plurality of light sources for emitting light beams and a light guide plate for receiving the light beams emitted by the light sources. The light guide plate comprises a light input surface and a light output surface joining the light input surface. The light input surface comprises a plurality of recesses therein, which have a cylindrical surface with a certain curvature. Each cylindrical surface is opposite to a corresponding light source, and the light beams emitted by the light source pass through the cylindrical surface orthogonally.

Other objects, advantages, and novel features of the present invention will become more apparent from the following detailed description when taken in conjunction with the accompanying drawings.

DETAILED DESCRIPTION OF THE PRESENT INVENTION

Figure 1:
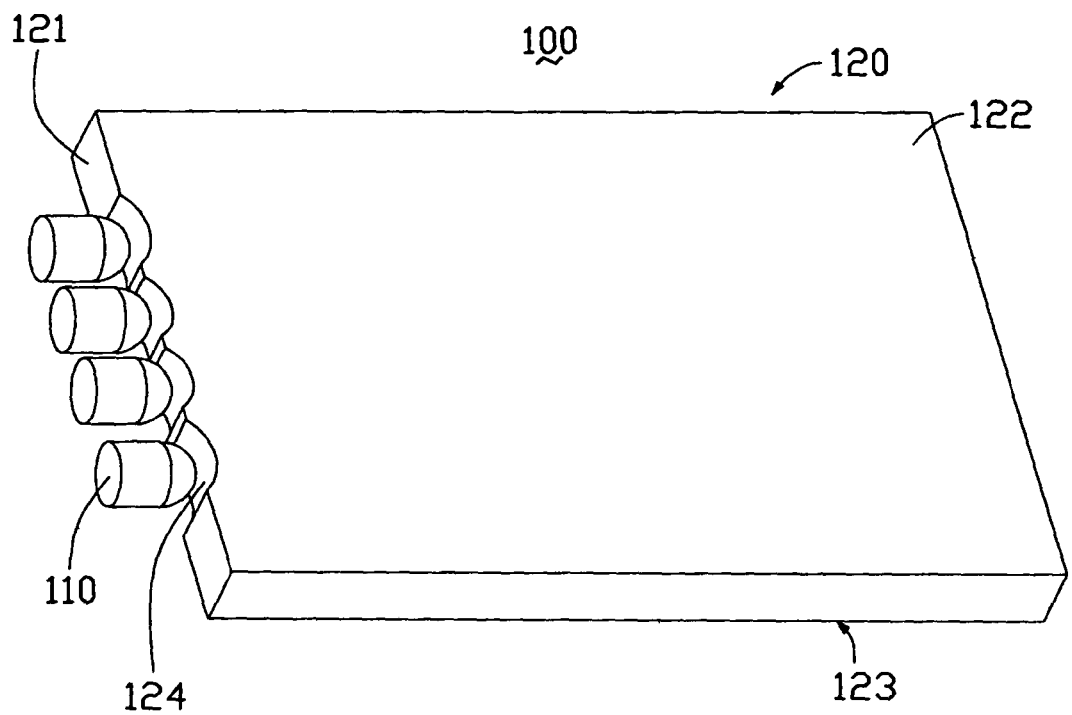
FIG. 1 is a perspective view of a backlight system according to the present invention.

Referring to FIG. 1, a backlight system 100 in accordance with the present invention is used to illuminate a liquid crystal display device. The backlight system 100 comprises a plurality of light sources 110 and a light guide plate 120. The light sources 110 emit light, and the light guide plate 120 is arranged adjacent to the light sources 110 to receive the light emitted therefrom.

The light sources 110 can be light emitting diodes, miniature bulbs, or the like. The luminance of the light sources 110 can be adjusted.

Figure 2:
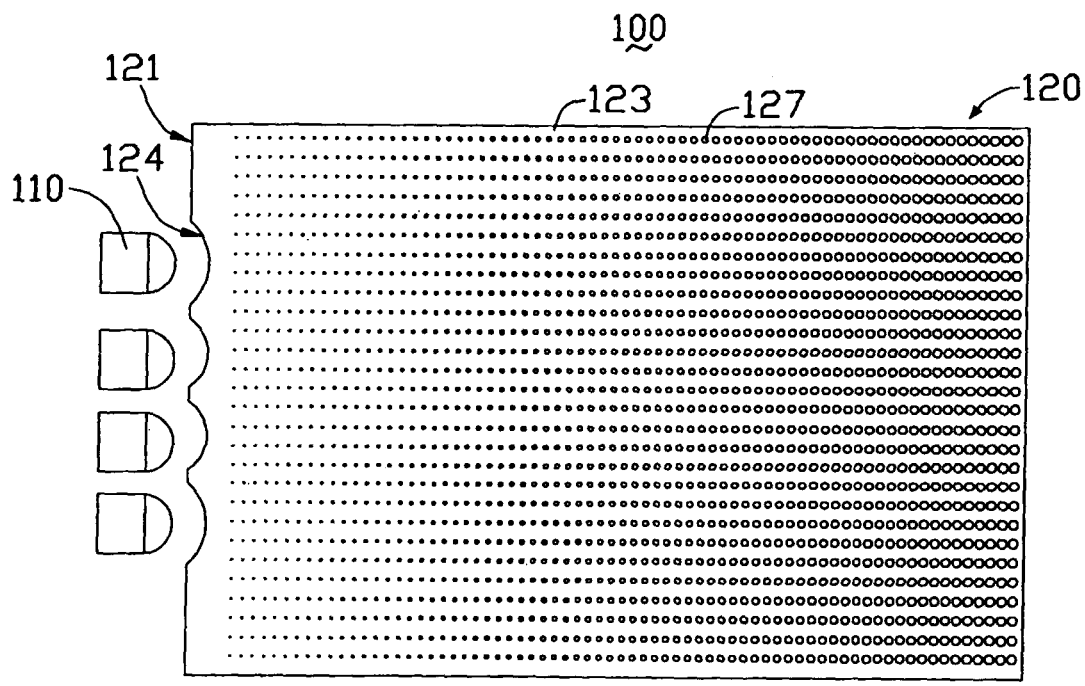
FIG. 2 is a bottom view of the backlight system in FIG. 1.

Referring also to FIG. 2, the light guide plate 120 is shaped as a planar sheet and can be made of a transparent acrylic plastic. The light guide plate 120 comprises a light input surface 121, a light output surface 122 joining the light input surface 121, and a bottom surface 123 opposite to the light output surface 122. The light input surface 121 comprises a plurality of recesses 124 therein. Each recess 124 has a cylindrical surface with a specific curvature, each recess 124 being respectively opposite to a corresponding light source 110. Each light source 110 is arranged at the center of a corresponding cylindrical surface where that center is defined as the point which is equidistant from all points of that cylindrical surface, thus, the light beams emitted by each light source 110 pass through the cylindrical surface orthogonally. Therefore, few light beams are reflected. Moreover, the angle subtended by the cylindrical surface at each light source 110 is equal to the emitting angle of the light sources 110. Therefore, almost all the light beams emitted by each light source 110 pass through the cylindrical surface of its corresponding recess 124 orthogonally and are transmitted into the light guide plate 120. The bottom surface 123 of the light guide plate 120 has a dot-pattern 127 thereon, for improving the uniformity of light emitted from the light guide plate 120. The dot-pattern 127 can be manufactured by printing reflective dots (not labeled) or by molding projections (not labeled) on the bottom surface 123. The sizes of the dots in the dot-pattern 127 increase in a direction away from the light input surface 121. The shape of each molded projection can be hemispherical, cylindrical, square or conical. Moreover, a plurality of v-cut grooves (not shown) can be formed in the bottom surface 123 to substitute for the dot-pattern 127.

Figure 3:
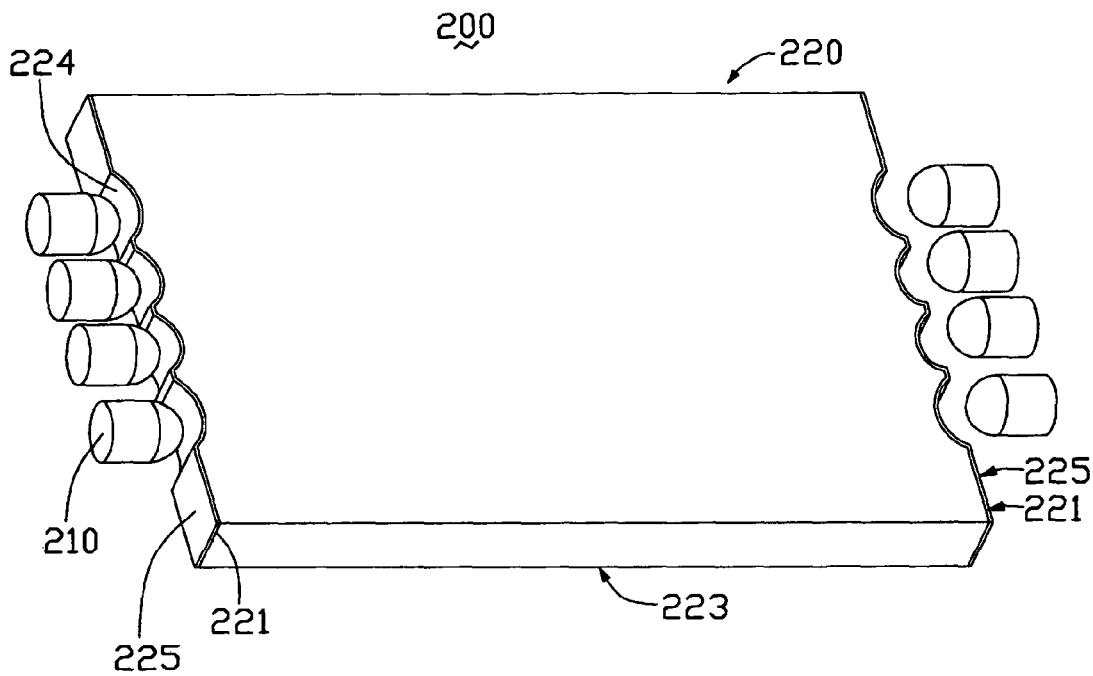
FIG. 3 is a perspective view of a second embodiment of a backlight system according to the present invention.
Figure 4:
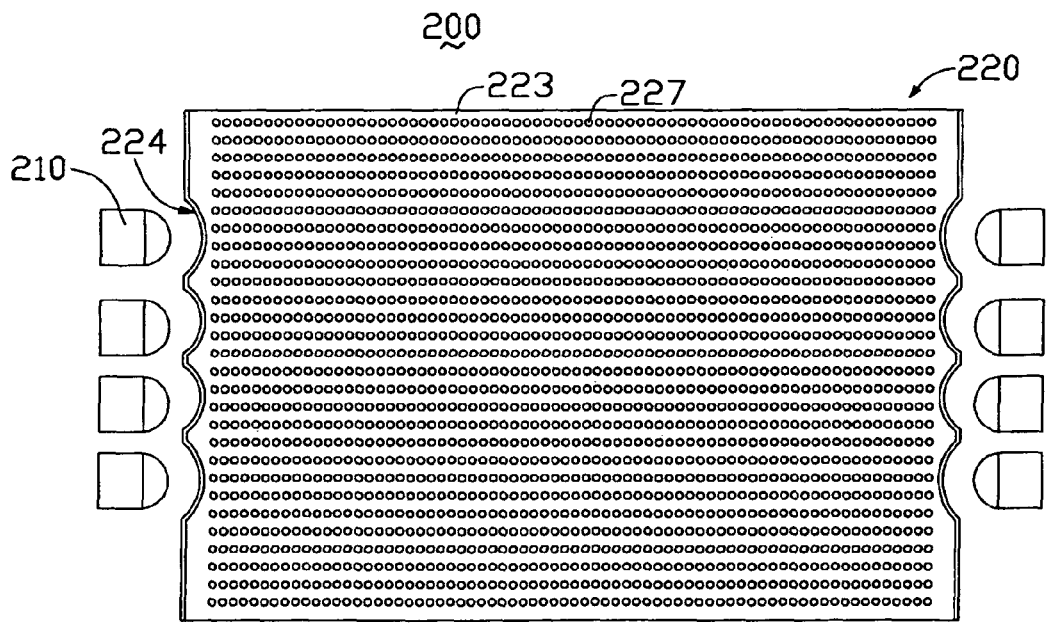
FIG. 4 is a bottom view of the backlight system in FIG. 3.

Turning to FIGS. 3–4, a second embodiment of a backlight system 200 in accordance with the present invention is similar to the backlight system 100. The difference therebetween is that the backlight system 200 comprises a light guide plate 220, which includes two light input surfaces 221. Each light input surface 221 has a plurality of recesses 224 therein. Each light input surface 221 further comprises an anti-reflective film 225 thereon, which covers the light input surface 221 and the recesses 224. The anti-reflective films 225 can improve an efficient utilization of the light beams emitted by the light sources 210 by transmitting more of the light beams into the light guide plate 220. The bottom surface 223 has a dot-pattern 227 thereon, which has regularly arranged dots (not labeled) to enhance the optical characteristics of the light guide plate 200.

Figure 5:
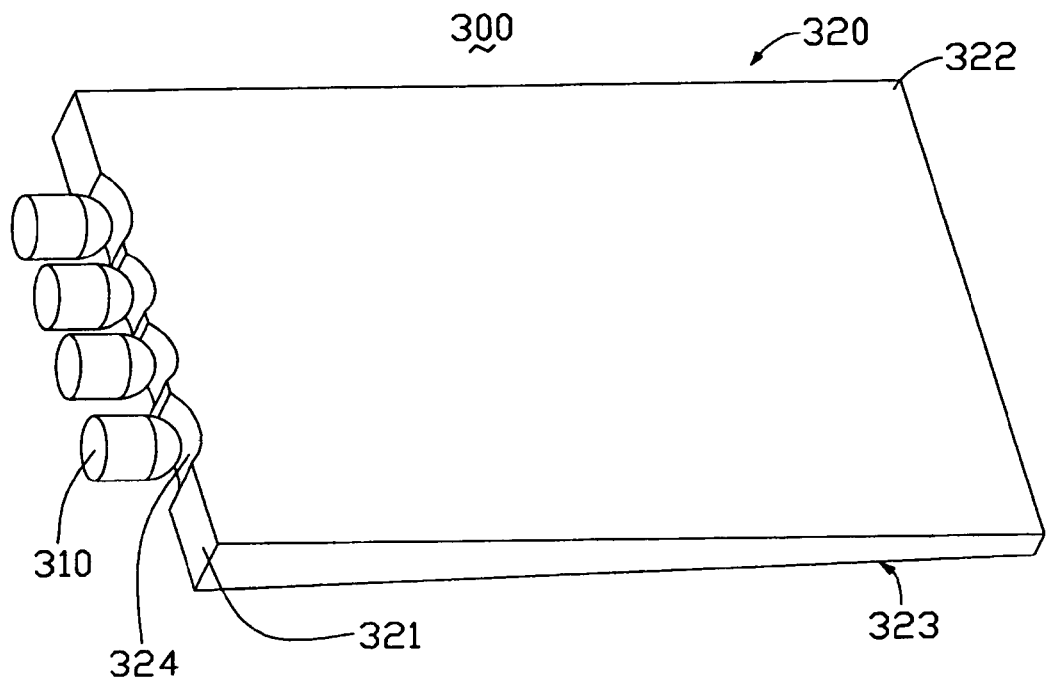
FIG. 5 is a perspective view of a third embodiment of a backlight system according to the present invention.

FIG. 5 shows a third embodiment of a backlight system 300 in accordance with the present invention. The backlight system 300 comprises a plurality of light sources 310 and a light guide plate 320, wherein the light guide plate 320 is in the shape of a wedge. The light guide plate 320 comprises a light input surface 321, a light output surface 322 and a bottom surface 323 opposite to the light output surface 322. The light input surface 321 comprises a plurality of recesses 324 therein. The bottom surface 323 has a reflective coating (not shown) thereon, which reflects the light beams to prevent the light beams from transmitting out of the light guide plate 320 through the bottom surface 323.

Figure 6:
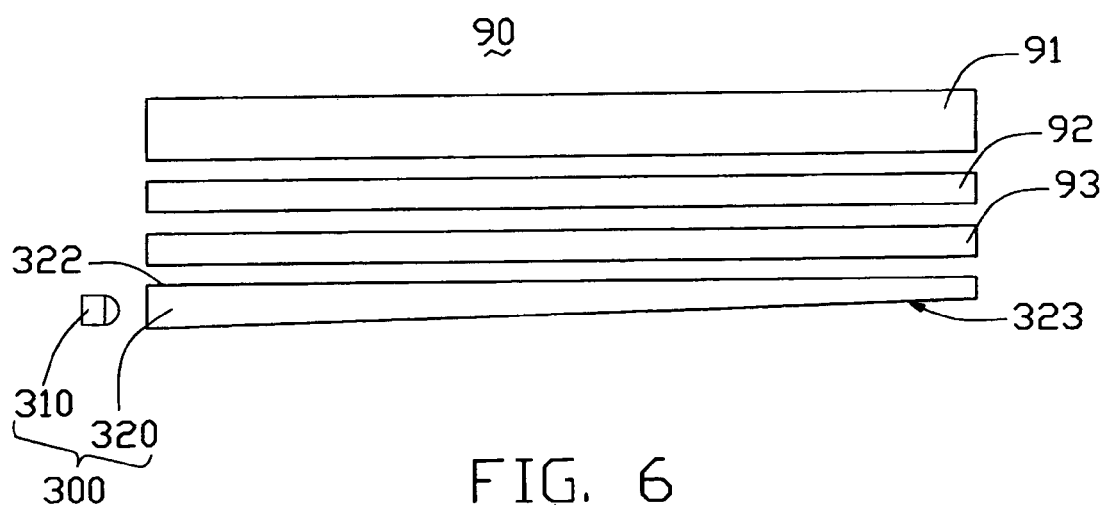
FIG. 6 is a schematic view of a liquid crystal display device using the backlight system of FIG. 5.
Figure 7:
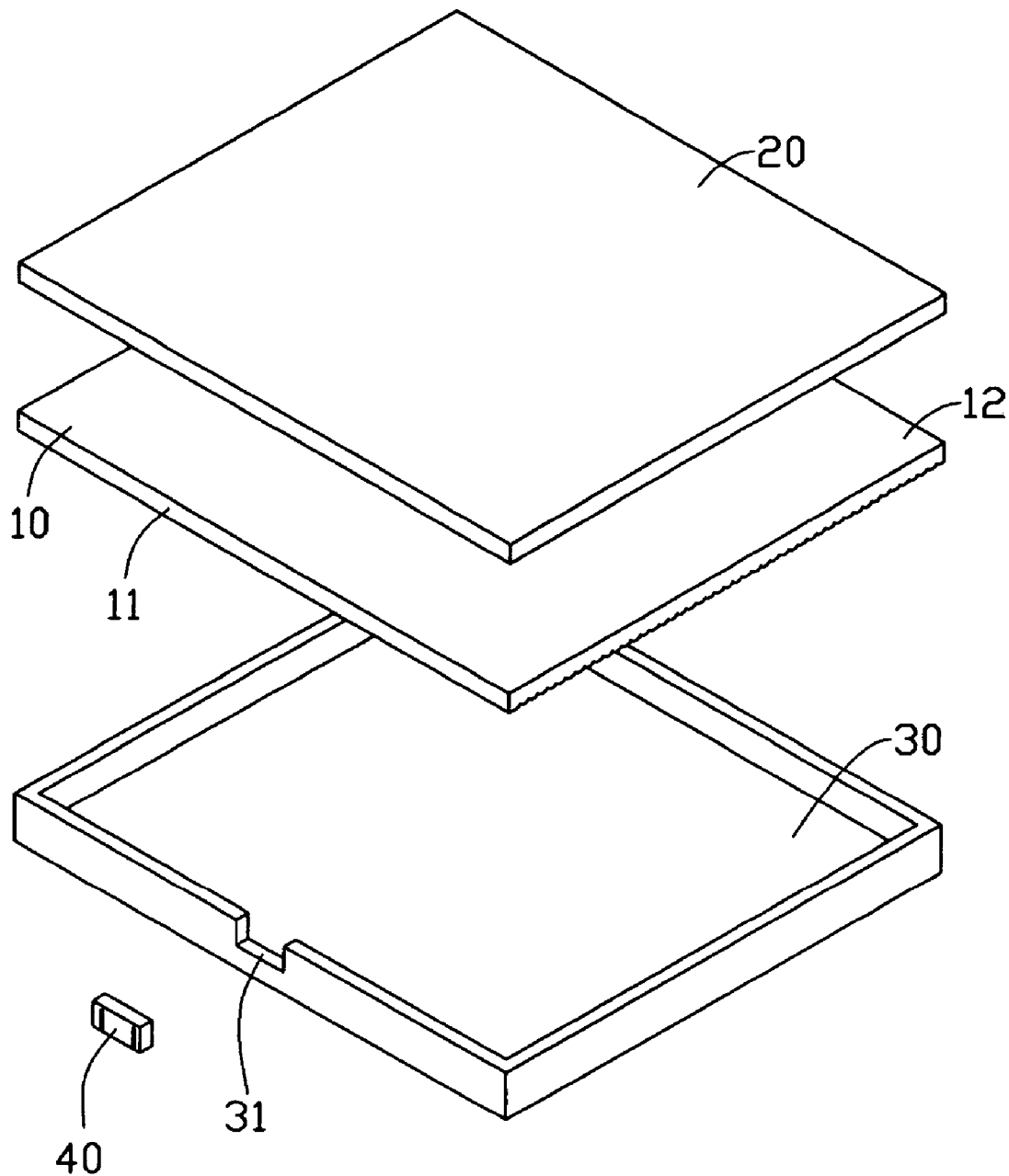
FIG. 7 is an exploded, perspective view of a conventional backlight system.

FIG. 6 shows an LCD device 90 using the backlight system 300. It could instead, of course, use either of the backlight systems 200, 100. The LCD device 90 comprises the backlight system 300, a diffusion sheet 93, a prism sheet 92 and a liquid crystal panel 91, which are arranged in order. The backlight system 300 is arranged under the liquid crystal panel 91, and comprises a plurality of light sources 310 and a light guide plate 320. In operation, light beams emitted by the light sources 310 enter into the light guide plate 320, are then transmitted out from the light output surface 322, and are then passed through the diffusion sheet 93 and the prism sheet 92 to illuminate the liquid crystal panel 91.

Advantages of the present invention over the prior art include the following. First, the light beams emitted pass through the cylindrical surfaces orthogonally. As a result, nearly all of the light beams enter into the light guide plate, so the backlight system is highly efficient in light utilization. Second, few light beams are reflected, therefore, the backlight system has a high brightness.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A backlight system for a display device, comprising:
a plurality of light sources for emitting light beams; and
a light guide plate for receiving the light beams emitted by the light sources, which light guide plate comprises a light input surface having an anti-reflection coating thereon, and a light output surface joining the light input surface;
wherein the light input surface has a plurality of recesses defined therein, the recesses each having a cylindrical surface with a specific curvature, each of the cylindrical surfaces being opposite to a corresponding light source, so that the light beams emitted by the light source pass through the cylindrical surface orthogonally.

2. A liquid crystal display comprising:
a liquid crystal panel; and
a backlight system arranged under the liquid crystal panel for illuminating it, the backlight system comprising:
a plurality of light sources for emitting light beams; and
a light guide plate for receiving the light beams emitted by the light sources, which light guide plate comprises a light input surface having an anti-reflection coating thereon, and a light output surface joining the light input surface;
wherein the light input surface has a plurality of recesses defined therein, the recesses each have cylindrical surfaces defining a certain curvature, and each cylindrical surface is opposite to a corresponding light source, and the light beams emitted by the light source pass through the corresponding cylindrical surface orthogonally.

3. A liquid crystal display comprising:
a plurality of light sources for emitting light beams; and
a light guide plate defining a main light output face and a light input face essentially perpendicular to said light output face, said light sources positioned beside said light guide plate and facing said light input face;
wherein said light input face defines a plurality of concavities respectively aligned with the corresponding light sources along a direction perpendicular to said light input face, whereby the light beam derived from each of said light sources distributes substantially even intensity on the corresponding concavity due to similar distances between various portions of the corresponding concavity and said light source; and
each of said concavities spans essentially less than one fourth of a circumference of an imaginary circle defined by said concavity.

4. The liquid crystal display as claimed in claim 3, wherein a tip of each of said light sources is substantially located outside of the corresponding concavity and outside of said light input face.

* * * * *